(12) United States Patent
Steffens et al.

(10) Patent No.: US 7,423,760 B2
(45) Date of Patent: Sep. 9, 2008

(54) METHOD AND APPARATUS FOR MONITORING AN INTERFEROMETER

(75) Inventors: Wolf Steffens, Herrenberg (DE); Ulrich Kallmann, Tuebingen (DE); Bernd Nebendahl, Ditzingen (DE); Emmerich Mueller, Aidlingen (DE); Ralf Haeussler, Gaertringen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 351 days.

(21) Appl. No.: 10/530,934

(22) PCT Filed: Oct. 11, 2002

(86) PCT No.: PCT/EP02/11390

§ 371 (c)(1),
(2), (4) Date: Oct. 3, 2005

(87) PCT Pub. No.: WO2004/033986

PCT Pub. Date: Apr. 22, 2004

(65) Prior Publication Data

US 2006/0119857 A1 Jun. 8, 2006

(51) Int. Cl.
*G01B 9/02* (2006.01)

(52) U.S. Cl. ...................................... 356/451; 356/484
(58) Field of Classification Search ................. 356/451, 356/484
See application file for complete search history.

(56) References Cited

U.S. PATENT DOCUMENTS

| 5,764,362 A * | 6/1998 | Hill et al. ...................... 356/487 |
| 6,421,120 B1 * | 7/2002 | Wildnauer ............... 356/243.1 |
| 6,570,894 B2 | 5/2003 | Anderson ...................... 372/32 |

FOREIGN PATENT DOCUMENTS

| EP | 1172637 | 1/2002 |
| FR | 2629197 | 3/1988 |
| WO | WO 98/38475 | 9/1998 |

* cited by examiner

*Primary Examiner*—Hwa (Andrew) S Lee

(57) ABSTRACT

An apparatus and to a method of monitoring an interferometer, comprising the steps of: coupling a first optical signal into the interferometer and into a wavelength reference element, detecting a first resulting interference signal being a result of interference of parts of the first optical signal in the interferometer, detecting a resulting reference signal of the wavelength reference element, the resulting reference signal being a result of interaction of the first optical signal with the wavelength reference element, and comparing the first resulting interference signal with the resulting reference signal to detect a drift of the interferometer, if any.

19 Claims, 5 Drawing Sheets

METHOD AND APPARATUS FOR MONITORING AN INTERFEROMETER

BACKGROUND OF THE INVENTION

The present invention relates to interferometer monitoring, in particular to a method and an apparatus for monitoring an interferometer, more particular to a method and an apparatus for stabilizing an interferometer.

SUMMARY OF THE INVENTION

It is an object of the invention to provide improved interferometer monitoring. Preferred embodiments are shown by the dependent claims.

Due to a preferred embodiment of the present invention it is possible to monitor an interferometer, in particular to monitor an interferometer regarding its drift, in particular its drift dependent on temperature, pressure, humidity, magnetism and/or voltage.

According to a further embodiment of the present invention it is possible to detect the temperature, pressure, humidity, magnetism, voltage dependency of properties of a device under test if the device under test is incorporated in the interferometer.

According to an embodiment it is possible to stabilize the interferometer on the basis of the detected drift, in particular to stabilize the interferometer to perform a measurement of the wavelength of an optical signal with unknown wavelength independent of temperature, pressure, humidity, magnetism or voltage influencing the interferometer, therefore providing an absolute wavelength reference unit having so far unknown accuracy.

Furthermore, according to an embodiment of the present invention it is possible to tune a useful optical signal of a laser source independent of temperature, pressure, humidity, magnetism and/or voltage in the area of the interferometer. Therefore, it is possible to perform high precision measurements using a continuously swept tunable laser source.

In a further preferred embodiment the first optical signal is substantially permanently swept in wavelength up and down, preferably within a predetermined sweeping range, the sweeping range preferably covering an absorption feature of the wavelength reference element, the latter being preferably a gas absorption cell. Using this method it is possible to monitor and preferably stabilize the interferometer in a fast and precise way.

In another embodiment the first optical signal is locked to an absorption feature of the wavelength reference element. When still detecting a first resulting interference signal being a result of interference of parts of the first optical signal in the interferometer it is clear that this interference can only be the result of a temperature, pressure, humidity, magnetism and/or voltage dependent drift of the interferometer itself since the first optical signal is locked to the absolute wavelength reference of the wavelength reference element. Furthermore, it is possible to detect a second resulting interference signal being a result of interference of parts of the first optical signal in the interferometer and to compare the phase of the first and the second resulting interference signals to evaluate the direction of the drift, e.g. by a direction sensitive fringe counting method using the two detected interference signals.

In a preferred embodiment of the present invention there is additionally provided a second optical signal by a second optical source to the interferometer and to the wavelength reference element using a further detector for detecting a second resulting interference signal being a result of interference of parts of the second optical signal in the interferometer, and a locking circuit for locking the second optical signal to a specified position, such as an extremum, of the second resulting interference signal, and a further detector for detecting a change of a beat signal of a superposition of the first and the second optical signal to detect the drift. Preferably the second optical signal has a slightly different wavelength with respect to the first optical signal and has the same polarization with respect to the first optical signal. However, both signals can use the same path. It is clear that if a deviation of a beat signal occurs between the two optical signals the specified position of the second resulting interference signal must have suffered from a temperature, pressure, humidity, magnetism and/or voltage dependent drift of the interferometer which drift can thereby be detected.

According to an embodiment of the present invention the detected drift can be compensated by a variable optical delay provided by a variable optical delay unit. This unit can be introduced anywhere in the interferometer. The unit can preferably use an element, which can vary a refractive index within the interferometer path to change the optical path length within such a path. The unit can preferably comprise a liquid crystal to perform quick changes of the optical path to provide a quick reaction on fast temperature, pressure, humidity, magnetism and/or voltage dependent changes of the properties of the monitored interferometer.

It is further preferred to use another optical signal similar to the first optical signal but having a substantially different wavelength. Coupling such further optical signal preferably in the same path as the first optical signal and locking such further optical signal to the same optical wavelength reference element and also detecting a resulting interference signal of such further optical signal it is possible to evaluate a wavelength dependency of the detected drift if there occurs a difference between the drift evaluated on the basis of the first optical signal compared to the drift of the interferometer evaluated on the basis of the further optical signal having a substantially different wavelength.

It is preferred to use the same polarization for the first, the second and the further optical signal but to use a polarization of the useful optical signal which is orthogonal to the first, the second and/or the further optical signal so that there is no polarization cross coupling between the useful optical signal and the other optical signals within the interferometer, in particular when some or all of the optical signals use the same optical path.

The invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF PREFERRED EMBODIMENTS OF THE INVENTION

Figure 1:
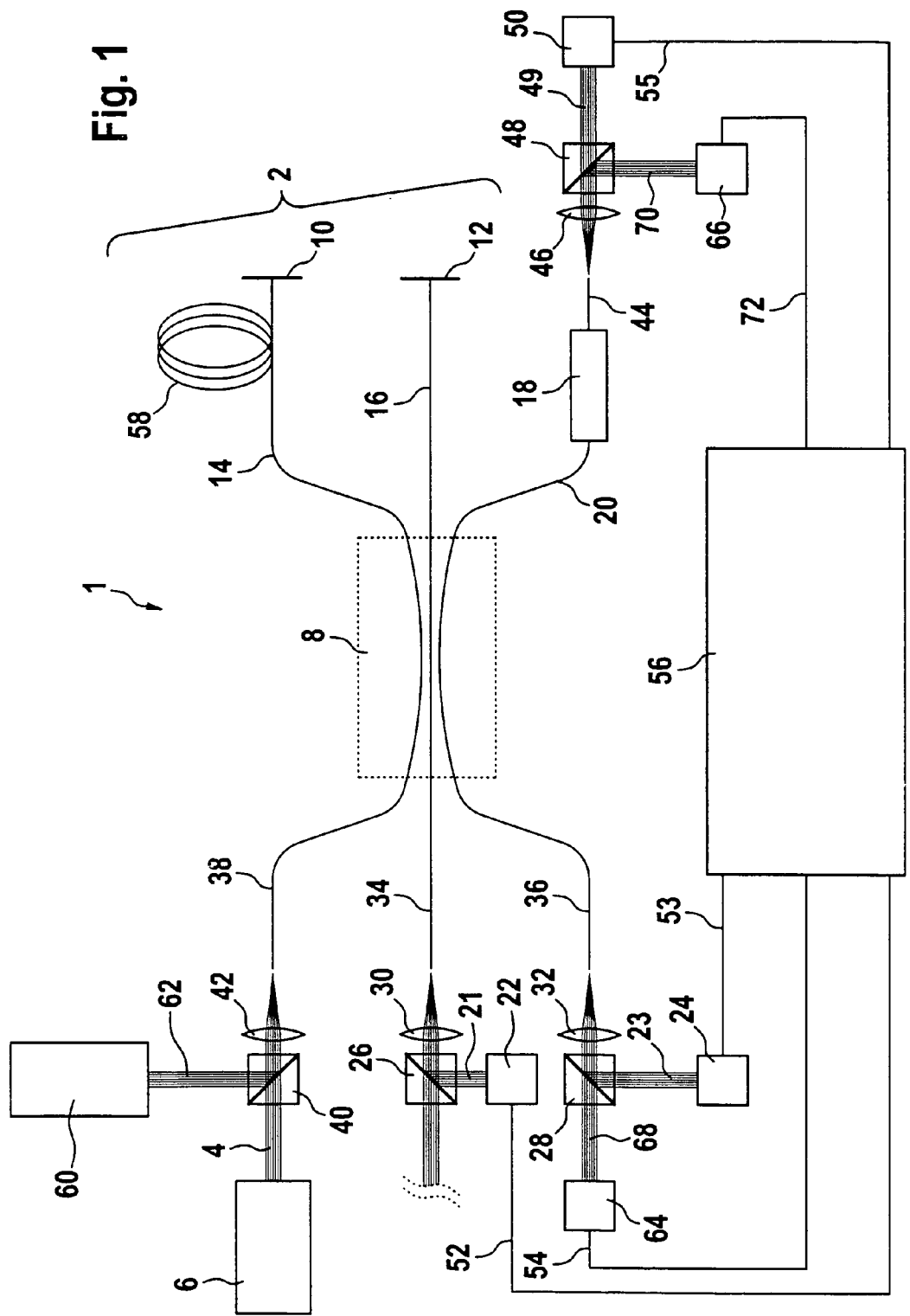
FIG. 1 to 5 show schematic illustrations of embodiments of the present invention.

Referring now in greater detail to the drawings, FIG. 1 shows an apparatus 1 for monitoring an interferometer 2. The displayed apparatus 1 is used for evaluating a wavelength of a useful optical signal 4 of a tunable laser source 6.

Interferometer 2 comprises a three-port coupler 8, to Faraday mirrors 10 and 12 connected via fibers 14, 16 to coupler 8, photodiodes 22 and 24 serving as detectors and connected to coupler 8 via polarization beam splitters 26, 28, lenses 30, 32 and fibers 34, 36, and a fiber 38 into which the useful optical signal 4 is supplied via a polarization beam splitter 40 and a lens 42.

Additionally, coupler 8 is connected to an absorption cell 18 via a fiber 20. A signal of outgoing fiber 44 of absorption cell 18 is detected via a lens 46 and a polarization beam splitter 48 by a detector 50.

Detectors 22, 24 and 50 are connected via connecting lines 52, 53 and 55 to an evaluation unit 56.

An evaluation of a wavelength of the optical signal 4 by the evaluation unit 56 works as follows: optical signal 4 of unknown wavelength is coupled via polarization beam splitter 40 and lens 42 into fiber 38 of interferometer 2. Coupler 8 connected to fiber 38 splits the optical signal 4 into three parts that are coupled into fibers 14, 16 and 20. Into fiber 14 there is introduced a delay by a loop 58 so that the respective part traveling through fiber 14 and being reflected by Faraday mirror 10 is delayed with respect to the part traveling through fiber 16 and being reflected by Faraday mirror 12. Therefore, interference between the two reflected signals occurs in coupler 8 and interference fringes in resulting superimposed signals 21 and 23 can be detected via fibers 34, 36, lenses 30, 32 and polarization beam splitter 23, 26, 28 by the detectors 22 and 24.

The fringes of interference in signals 21 and 23 detected by detectors 22 and 24 are digitally counted by evaluation unit 56. The presence of two photodiodes 22, 24 allows for a direction sensitive fringe counting by the evaluation unit 56. Since the third part of optical signal 4 is coupled out of coupler 8 via fiber 20 into absorption cell 18, and the output signal 49 of absorption cell 18 can be detected via fiber 44, lens 46, polarization beam splitter 48 by the detector 50, a calibration of the interferometer 2 is possible by determining the free spectral range (FSR) of the interferometer 2 on the basis of the known absorption features of absorption cell 18 serving as a wavelength reference element according to this embodiment of the present invention. As a gas for the absorption cell 18 $C_2H_2$ can be used.

Interferometer 2 is exposed to external factors as temperature, pressure, humidity, magnetism and/or voltage, which factors result in a time dependent phase shift and a varying FSR. Therefore, apparatus 1 according to the embodiment displayed in FIG. 1 is employed to monitor and stabilize the performance of interferometer 2, with evaluation and stabilizing unit 56 detecting a temperature, pressure, humidity, magnetism and/or voltage dependent drift of interferometer 2 and providing a value of the measurement of the wavelength of optical signal 4 considering the evaluated drift of interferometer 2.

For the aforementioned purposes apparatus 1 comprises a distributed feedback (DFB) laser 60 providing a first optical signal 62 to the polarization beam splitter 40 for coupling the first optical signal 62 into the interferometer 2 and into the wavelength reference element 18. Since both optical signals 4 and 62 are provided to the polarization beam splitter 40 they can travel the same paths in interferometer 2 since they are orthogonal polarized by polarization beam splitter 40 so that there is no polarization cross coupling between optical signals 4 and 62. Accordingly, polarization beam splitters 28 and 48 enable the detection of a first resulting interference signal 68 with the help of a detector 64, the first resulting interference signal 68 being a result of interference of parts of the first optical signal 62 in the interferometer 2, and to detect a resulting reference signal 70 of the wavelength reference element 18, the resulting reference signal 70 being a result of interaction of the first optical signal 62 with the wavelength reference element 18, with the help of a detector 66. Detectors 64 and 66 are connected to evaluation unit 56 via connecting lines 54 and 72 to enable evaluation unit 56 to compare the first resulting interference signal 68 with the resulting reference signal 70 to detect a drift of the interferometer 2, if any. To facilitate this comparison the DFB laser 60 is permanently wavelength swept within a predetermined wavelength sweeping range which range covers at least one complete absorption feature of absorption cell 18 so that the first resulting interferometer signal 68 at photo detector 64 and the absorption spectrum of reference cell 18 detected by detector 66 can be compared and a possible FSR drift can be interfered by the evaluation unit 56.

Figure 2:
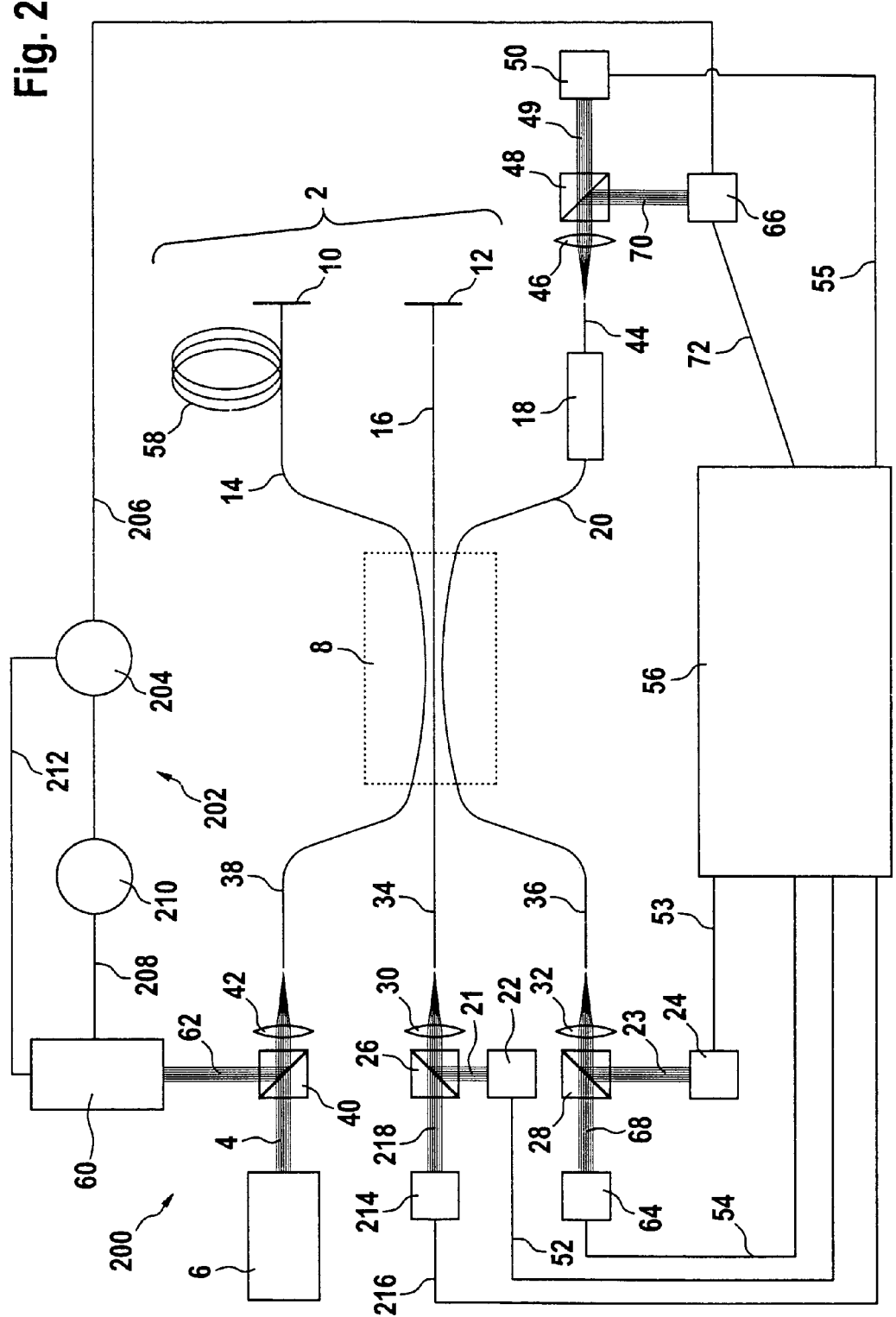

FIG. 2 shows a second apparatus 200 according to a second embodiment of the present invention. According to FIG. 2 in apparatus 200 the first optical signal 62 of DFB laser 60 is locked to an absorption feature of absorption cell 18 via a locking circuit 202. Locking circuit 202 comprises a mixer 204 receiving a signal of detector 66 by a connecting line 206 and a local oscillator signal 210 of DFB laser 60 by a connecting line 208 and outputting a locking signal via a connecting line 212 to DFB laser 60. Alternatively, DFB laser 60 can be a laser having a fixed wavelength of first optical signal 62.

The function of embodiment 200 is as follows: if evaluation unit 56 detects interference fringes by photo detector 64 it is clear that a drift of interferometer 2 has occurred. To detect the direction of the drift apparatus 200 comprises a further detector 214 to provide evaluation unit 56 with two detector signals 54 and 216 of detectors 64 and 214 to enable evaluation unit 56 for a direction sensitive fringe counting on the basis of a comparison of the phase of the first resulting interference signal 68 and a second resulting interference signal 218.

Figure 3:
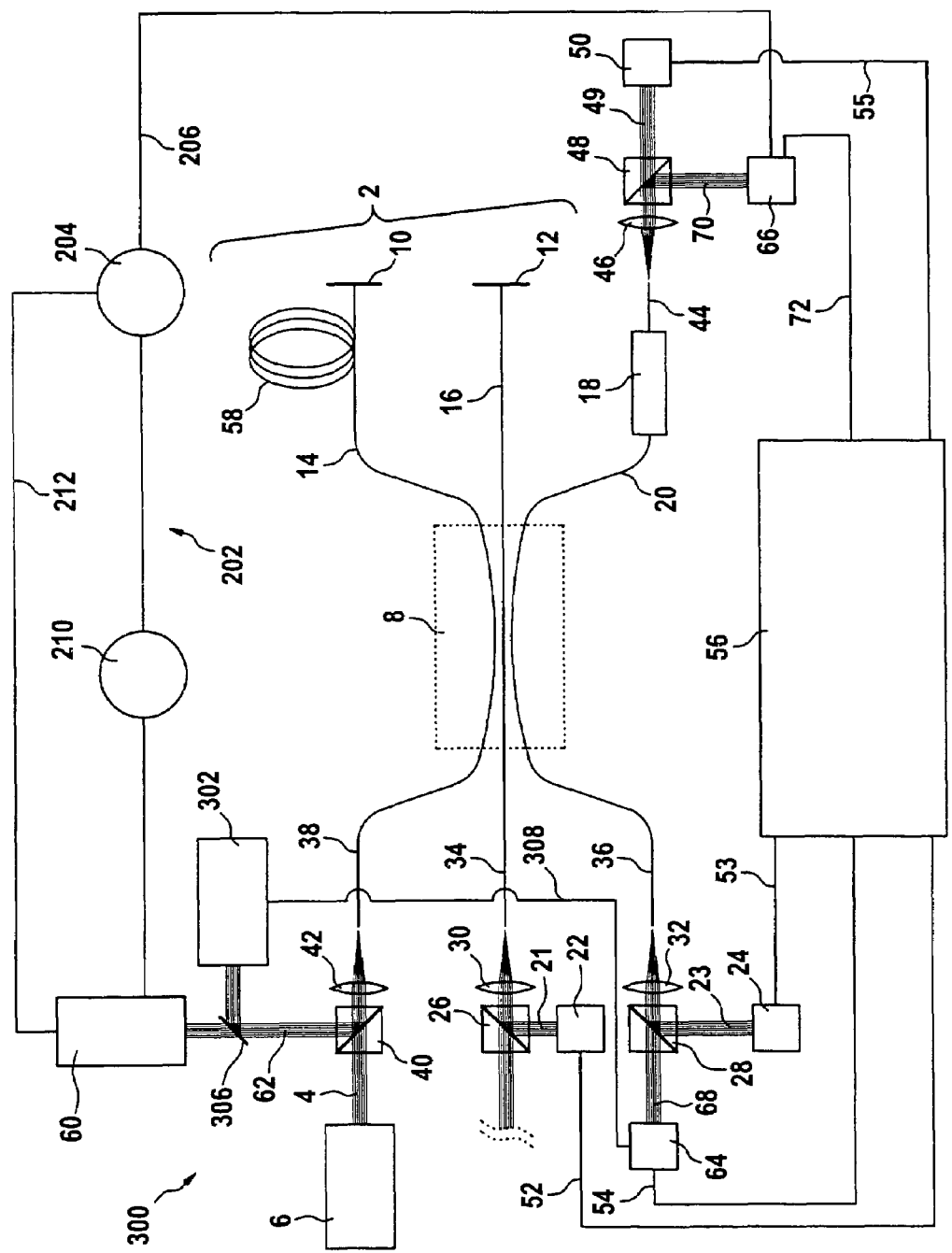

FIG. 3 shows an apparatus 300 according to a third embodiment of the present invention. Additional to apparatus 200 of FIG. 2 apparatus 300 comprises a second DFB laser 302 providing a second optical signal 304 via a semi transparent mirror 306, polarization beam splitter 40, lens 42 to interferometer 2 and to absorption cell 18. Optical signal 304 of DFB laser 302 is locked to a specified position, such as an extremum, of the second resulting interference signal 68 by a locking circuit 308.

Apparatus 300 of FIG. 3 works as follows: Since both the first optical signal 62 and the second optical signal 304 have the same polarization both signals will interfere in interferometer 2 and create a beat signal 70 at detector 66 if there is a drift of interferometer 2, which beat signal 70 is detected by heterodyne measurement and delivered by the connecting line 72 to evaluation unit 56. To achieve the best results a very broad frequency range for the beat frequency measurement by detector 66 should be realized.

Figure 4:
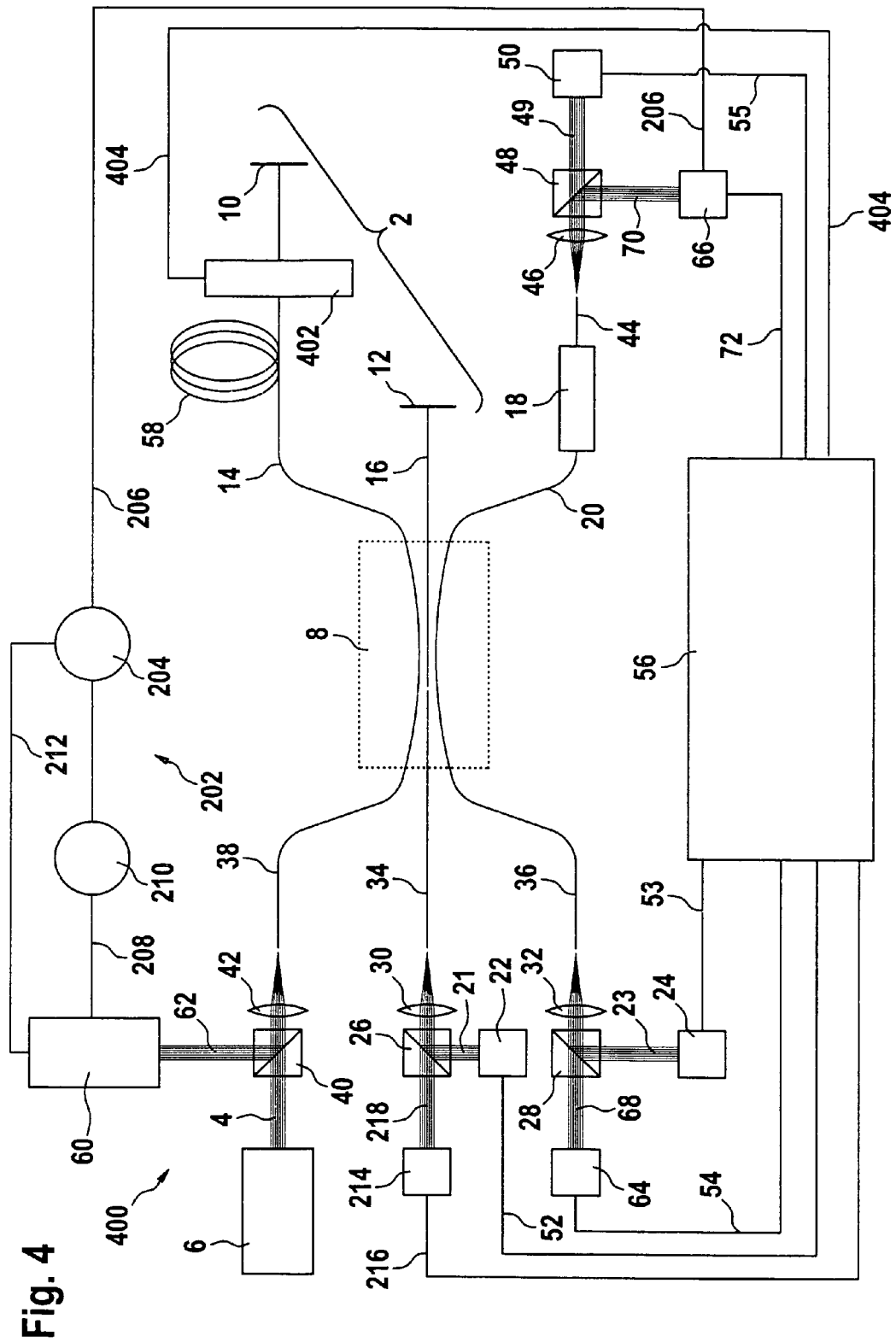

FIG. 4 shows an apparatus 400 according to a fourth embodiment of the present invention. Apparatus 400 is substantially the same as apparatus 200 of FIG. 2 but further comprises a variable optical delay unit 402 introduced into interferometer 2 into path 14. Delay unit 402 is connected by a connecting line 404 to evaluation unit 56. If evaluation unit 56 evaluates a drift of interferometer 2 it can generate a control signal by a not shown control signal generator and deliver that control signal by connecting line 404 to variable optical delay unit 402 to introduce a variable optical delay into path 14 of interferometer 2 thereby compensating a possible drift of interferometer 2. Such a variable optical delay unit controlled by evaluation unit 56 can be introduced in all embodiments 100, 200, 300, 400 and 500. As a variable optical delay unit 402 it is possible to use any element, which can vary the refractive index of path 14, e.g. a liquid crystal.

Figure 5:
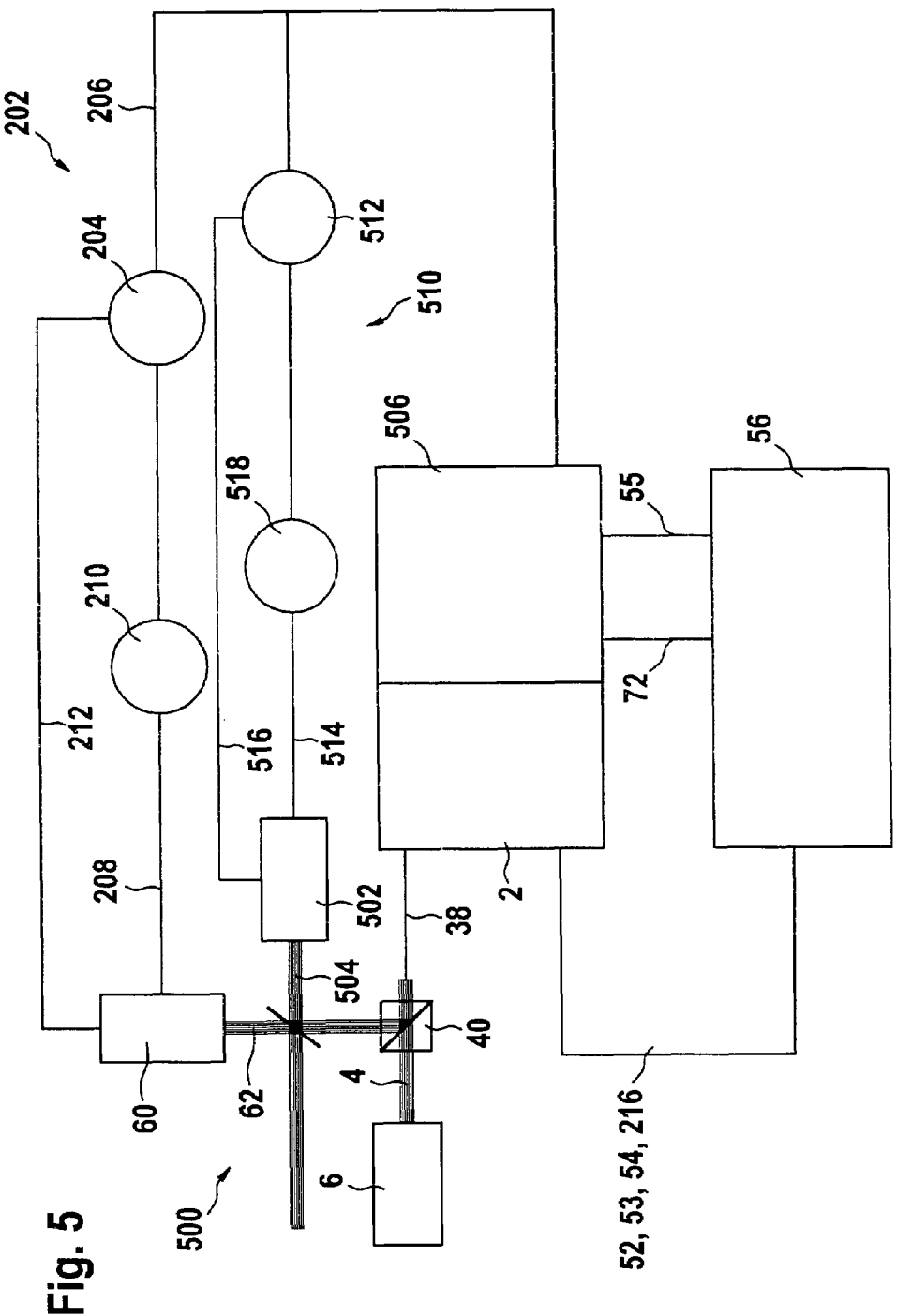

FIG. 5 shows an apparatus 500 according to a fifth embodiment of the present invention. Additional to the apparatus 200 of FIG. 2 apparatus 500 comprises a further laser source 502. In this embodiment DFB laser 502 generates a third optical signal 504, which has a wavelength substantially far away from the wavelength of first optical signal 62 of DFB laser 60. The third optical signal 504 is coupled into the interferometer and into a wavelength reference unit 506. In FIG. 5 wavelength reference unit 506 is introduced for simplification of the drawing, only. Besides that wavelength reference unit 506 comprises the same elements as in the other embodiments shown in the drawings, i.e. the absorption cell 18, lens 46, polarization beam splitter 48 and detectors 50 and 66. Apparatus 500 is similar to apparatus 200 but furthermore comprises a locking circuit 510 locking the optical signal 504 of DFB laser 502 to an absorption feature of the absorption cell 18. Locking circuit 510 comprises the same elements as locking circuit 202, i.e. an incoming connecting line 206 from the wavelength reference unit 506, an incoming line 514 delivering the local oscillator signal 518 to a mixer 512 which mixer supplies a locking signal 516 to DFB laser 502. Thereby, it is possible to detect a wavelength dependency of any drift of the interferometer 2, also.

All shown embodiments 100, 200, 300, 400 can not only be used for the described purposes but can also be used to determine properties of a device under test incorporated into the interferometer 2.

What is claimed is:

1. A method of monitoring an interferometer, comprising:
coupling a first optical signal into the interferometer and into a wavelength reference element,
detecting a first resulting interference signal being a result of interference of first parts of the first optical signal in the interferometer,
detecting a resulting reference signal of the wavelength reference element, the resulting reference signal being a result of interaction of the first optical signal with the wavelength reference element,
comparing the first resulting interference signal with the resulting reference signal to detect a drift of the interferometer, and
substantially permanently sweeping a wavelength of the first optical signal up and down.

2. The method of claim 1, further comprising:
substantially permanently sweeping a wavelength of the first optical signal up and down within a predetermined sweeping range.

3. The method of claim 1, further comprising:
substantially permanently sweeping a wavelength of the first optical signal up and down within a predetermined sweeping range, and choosing the sweeping range in a way that it covers an absorption feature of the wavelength reference element.

4. The method of claim 1, further comprising:
detecting a second resulting interference signal being a result of interference of second parts of the first optical signal in the interferometer, and
comparing the phase of the first and the second resulting interference signals to evaluate the direction of the drift.

5. The method of claim 1, further comprising the steps of:
using the detected drift, if any, for stabilizing the interferometer.

6. The method of claim 5, further comprising using the detected drift for introducing a variable optical delay corresponding to the drift into the interferometer.

7. The method of claim 1, further comprising
using the detected drift, if any, for evaluating a property of the interferometer or a device under test being part of the interferometer, the property being a dependency of at least one of the following: temperature, pressure, humidity, magnetism, voltage.

8. The method of claim 1, further comprising
coupling a useful optical signal into the interferometer, and
detecting a useful resulting interference signal being a result of interference of parts of the useful optical signal in the interferometer for evaluating a wavelength of the useful optical signal.

9. The method of claim 1, further comprising:
coupling a useful optical signal into the interferometer along the same path as the first optical signal and having a substantially orthogonal polarization with respect to a polarization of at least one of the following: the first optical signal, the second optical signal, the third optical signal, and
detecting a useful resulting interference signal being a result of interference of parts of the useful optical signal in the interferometer for evaluating the wavelength of the useful optical signal.

10. A method of monitoring an interferometer, comprising:
coupling a first optical signal into the interferometer and into a wavelength reference element,
detecting a first resulting interference signal being a result of interference of parts of the first optical signal in the interferometer,
detecting a resulting reference signal of the wavelength reference element, the resulting reference signal being a result of interaction of the first optical signal with the wavelength reference element,
comparing the first resulting interference signal with the resulting reference signal to detect a drift of the interferometer, and
locking the first optical signal to an absorption feature of the wavelength reference element.

11. The method of claim 10, further comprising:
locking the first optical signal to an absorption feature of the wavelength reference element,
coupling a second optical signal into the interferometer and into the wavelength reference element,
detecting another resulting interference signal being a result of interference of parts of the second optical signal in the interferometer,
locking the second optical signal to a specified position of the another resulting interference signal, and
detecting a change of a beat signal of a superposition of the first and the second optical signal to detect the drift.

12. The method of claim 11, further comprising providing the first and the second optical signal with substantially the same polarization.

13. The method of claim 10, further comprising:
coupling a third optical signal into the interferometer and into the wavelength reference element, the third optical signal having a wavelength substantially different from the wavelength of the first optical signal,
detecting a third resulting interference signal being a result of interference of parts of the third optical signal in the interferometer,
locking the third optical signal to an absorption feature of the wavelength reference element, and
comparing the first resulting interference signal with the third resulting interference signal to detect a wavelength dependency of the drift.

14. The method of claim 10, further comprising:
detecting a second resulting interference signal being a result of interference of parts of the first optical signal in the interferometer, and
comparing the phase of the first and the second resulting interference signals to evaluate the direction of the drift.

15. The method of claim 10, further comprising using the detected drift, if any, for stabilizing the interferometer.

16. The method of claim 10, further comprising using the detected drift, if any, for evaluating a property of the interferometer or a device under test being part of the interferometer, the property being a dependency of at least one of the following: temperature, pressure, humidity, magnetism, voltage.

17. The method of claim 10, further comprising
coupling a useful optical signal into the interferometer, and
detecting a useful resulting interference signal being a result of interference of parts of the useful optical signal in the interferometer for evaluating a wavelength of the useful optical signal.

18. The method of claim 10, further comprising:
coupling a useful optical signal into the interferometer along the same path as the first optical signal and having a substantially orthogonal polarization with respect to a polarization of at least one of the following: the first optical signal, the second optical signal, the third optical signal, and
detecting a useful resulting interference signal being a result of interference of parts of the useful optical signal in the interferometer for evaluating the wavelength of the useful optical signal.

19. An apparatus for monitoring an interferometer, comprising:
a first coupler coupling a first optical signal of a first optical source into the interferometer and into a wavelength reference element,
a first detector detecting a first resulting interference signal being a result of interference of parts of the first optical signal in the interferometer,
a reference detector detecting a resulting reference signal of the wavelength reference element, the resulting reference signal being a result of interaction of the first optical signal with the wavelength reference element,
an evaluating unit comparing the first resulting interference signal with the resulting reference signal to detect a drift of the interferometer, and
a first locking circuit locking the first optical signal to an absorption feature of the wavelength reference element.

* * * * *